United States Patent
Bystrov et al.

(10) Patent No.: US 8,194,950 B2
(45) Date of Patent: Jun. 5, 2012

(54) COMPENSATING IN-PLANE AND OFF-PLANE MOTION IN MEDICAL IMAGES

(75) Inventors: Daniel Bystrov, Hamburg (DE); Vladimir Pekar, Toronto (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 979 days.

(21) Appl. No.: 12/066,512

(22) PCT Filed: Sep. 14, 2006

(86) PCT No.: PCT/IB2006/053278
§ 371 (c)(1),
(2), (4) Date: Jul. 31, 2008

(87) PCT Pub. No.: WO2007/031954
PCT Pub. Date: Mar. 22, 2007

(65) Prior Publication Data
US 2009/0116765 A1    May 7, 2009

(30) Foreign Application Priority Data
Sep. 15, 2005 (EP) .................................... 05108462

(51) Int. Cl.
*G06K 9/00* (2006.01)
(52) U.S. Cl. ...................................................... 382/128
(58) Field of Classification Search .......... 382/100–154; 324/300–322
See application file for complete search history.

(56) References Cited

U.S. PATENT DOCUMENTS
2004/0064036 A1    4/2004    Mao et al.

FOREIGN PATENT DOCUMENTS
WO    0184172 A1    11/2001

OTHER PUBLICATIONS

Eusemann et al, "Temporal and Spatial Resolution Required Forimaging Myocardial Function", Medical Imaging, Proceedings of SPIE, vol. 5367, 2004, p. 312-319.
Bystrov et al, "Motion Compensation and Plane Tracking for Kinematic MR-Imaging", Computer Vision for Biomedical Image Applications, vol. 3765, Oct. 21, 2005, p. 551-560.
Arun et al, "Least-Squares Fitting of Two 3-D Point Sets", IEEE Transactions on Pattern Analysis and Machine Intelligence, vol. 30, No. 5, Sep. 1, 1987, p. 698-700.
Lin et al, "Automated Image Registration for FDOPA Pet Studies", Phys. Med. Biol. vol. 41, 1996, p. 2775-2788.
Freegly et al, "An Automated Image Matching Procedure for Measuring Natural Knee Kinematics With Single-Plane Fluoroscopy", University of Florida, 50th Annual Meeting of the Orthopaedic Research Society, Paper No. 0086, Dec. 2004.
Meetz et al, "Viewing Workstation for 4D Kinematic MR Joint Studies", International Congress Serial, vol. 1281, 2005, pp. 68-73.

*Primary Examiner* — Dixomara Vargas

(57) ABSTRACT

The invention relates to a registration method (100) of registering a second image dataset with a first image dataset on the basis of a set of landmarks, said registration method (100) comprising a weight-assigning step (125) for assigning a weight to each coordinate of each landmark from the set of landmarks and a registering step (145) for registering the second image dataset with the first image dataset on the basis of the weight assigned to the each coordinate. Choosing an appropriate set of landmarks and assigning an appropriate weight to each coordinate of each landmark from the set of landmarks can be used for optimizing selected displacements of a designated anatomical structure comprising elastic bodies and/or a plurality of independent rigid bodies in a sequence of image datasets. This enables rendering a sequence of views wherein the designated anatomical structure is not displaced off a viewing plane and/or a selected part of the designated anatomical structure is not displaced in a viewing plane.

19 Claims, 5 Drawing Sheets

COMPENSATING IN-PLANE AND OFF-PLANE MOTION IN MEDICAL IMAGES

This invention relates to a registration method of registering a second image dataset with a first image dataset on the basis of a set of landmarks.

The invention further relates to a registration system for registering a second image dataset with a first image dataset on the basis of a set of landmarks.

The invention further relates to an acquisition system for acquiring an image dataset comprising said registration system.

The invention further relates to a workstation comprising said registration system.

The invention further relates to a computer program product to be loaded by a computer arrangement, comprising instructions for registering a second image dataset with a first image dataset on the basis of a set of landmarks.

An embodiment of the method of the kind described in the opening paragraph is described in a U.S. Patent Application 60/648,033, Applicant's reference number PHUS050050WO, hereinafter referred to as Ref. 1. This document describes an apparatus for and a method of diagnostic imaging. The described apparatus comprises a processor means for and the described method comprises steps for displaying viewing planes of 3D images in a cine format, where a designated anatomical structure remains fixed in each consecutive viewing plane. The method for fixing the designated anatomical structure in each image is based on image registration. First, a set L of n landmarks is selected and locations p(l) of landmarks l∈L in a first image dataset are found. Next, locations q(l) of landmarks l∈L in a second image dataset are found. A similarity function $$S_L(p(l_1), \ldots, p(l_n); q(l_1), \ldots, q(l_n)) = \sum_{l \in L} [(p_x(l) - q_x(l))^2 + (p_y(l) - q_y(l))^2 + (p_z(l) - q_z(l))^2],$$  Eq. 1 where $p_x(l)$, $p_y(l)$, $p_z(l)$ and $q_x(l)$, $q_y(l)$, $q_z(l)$ are Cartesian coordinates of the landmark locations p(l) and q(l), respectively, is used to define an objective function. The objective function $F_L(t)$ is defined as $$F_L(t) = S_L(p(l_1), \ldots, p(l_n); tq(l_1), \ldots, tq(l_n)),$$  Eq. 2 where t is a transformation of landmark locations in the second image dataset and $tq(l_i)$ denotes a transformed location of i-th landmark $l_i$ (i=1, ... n) obtained by applying the transformation t to the location $q(l_i)$. The domain of the objective function $F_L(t)$ comprises transformations t from the set of rigid transformations. Further, a transformation $t_{min}$ corresponding to the minimum of the objective function $F_L(t)$ is computed. The transformed locations $t_{min}q(l)$ define the optimal locations of landmarks l∈L in the second image dataset. Hence, the displacement of every landmark l in the second image dataset relative to the location of the respective landmark l in the first image dataset is optimized. The computed transformation $t_{min}$ is useful for rendering a view from the second image dataset. For example, if P is a plane defining a cross-section view in the first image dataset, a cross-section defined by a plane $t_{min}^{-1}(P)$ is rendered from the second image dataset.

The above method is useful, when a displacement of a single rigid body, for example of a single bone, comprising the designated anatomical structure anchored to a set of landmarks, has to be optimized. However, in more general scenes, where the designated anatomical structure comprises elastic bodies such as muscles, or independent rigid bodies such as multiple bones, such optimization may not be possible. This is due to the fact that the designated anatomical structure is no longer rigid and, consequently, the landmarks from the set of landmarks anchored to the designated anatomical structure in the second image dataset may be shifted relative to each other, i.e. the landmarks in the second image dataset may be non-rigidly displaced from their locations in the first image dataset.

It is an object of the invention to provide a registration method of the kind described in the opening paragraph for optimizing selected displacements of a designated anatomical structure comprising elastic bodies and/or a plurality of independent rigid bodies in a sequence of image datasets.

This object of the invention is achieved in that the registration method of registering a second image dataset with a first image dataset on the basis of a set of landmarks comprises:

a weight-assigning step for assigning a weight to each coordinate of each landmark from the set of landmarks; and a registering step for registering the second image dataset with the first image dataset on the basis of the weight assigned to the each coordinate.

The weight-assigning step for assigning a weight to each coordinate of each landmark from the set of landmarks allows to limit or to eliminate dependence of the subsequent registering step on some landmark coordinates while optimizing selected landmark coordinates and displacements. This is how it works: the objective function $F_L(t)$ of the current invention is defined in Eq. 2. The similarity function $S_L(p(l_1), \ldots, p(l_n); q(l_1), \ldots, q(l_n))$ can be any useful function of the locations p(l) of landmarks l∈L in the first image dataset and of the locations q(l) of landmarks l∈L in the second image dataset. The coordinates of the locations $p(l_1), \ldots, p(l_n)$ and $q(l_1), \ldots, q(l_n)$ are parameters of the objective function $F_L(t)$. First, in the weight-assigning step each landmark l∈L is assigned a weight vector w(l). Locations p(l), q(l), and the weight vector w(l) have the same number of components equal to the dimension of the image dataset. An i-th component $w_i(l)$ of the vector w(l) is assigned to the i-th coordinate of landmark locations in the first and in the second image dataset. In the registering step, each weight $w_i(l)$ is applied to the respective coordinate $(tq)_i(l)$ of the transformed location tq(l). This may be implemented, for example, in such a way that predefined terms of the expression of the objective function $F_L(t)$ comprising the component $(tq)_i(l)$ are multiplied by the weight $w_i(l)$. Thus, when a weight $w_j(\lambda)$ of a coordinate $(tq)_j(\lambda)$ of a landmark λ∈L is substantially equal to 0, then the objective function $F_L(t)$ is independent of the coordinate $(tq)_j(\lambda)$. Consequently, the coordinate $(tq)_j(\lambda)$ has no influence on the transformation $t_{min}$ obtained by optimizing the objective function $F_L(t)$ in the registering step of the registration method. Thus optimizing the objective function $F_L(t)$ does not involve adjusting the coordinate $(tq)_j(\lambda)$. On the other hand, when a weight $w_j(\lambda)$ of a coordinate $(tq)_j(\lambda)$ of a landmark λ∈L is not substantially equal to 0, then the objective function $F_L(t)$ is dependent on the coordinate $(tq)_j(\lambda)$. Consequently, the coordinate $(tq)_j(\lambda)$ has an influence on the transformation $t_{min}$ obtained by optimizing the objective function $F_L(t)$ in the registering step of the registration method. Thus optimizing of the objective function $F_L(t)$ involves adjusting the coordinate $(tq)_j(\lambda)$. For example, the difference between the coordinate $(tq)_j(\lambda)$ and the coordinate $p_j(\lambda)$, which difference describes the j-th component of the displacement of landmark λ in the second image dataset relative to the location of landmark λ in the first image dataset, is optimized. Hence, the registration method of the present invention proves useful for optimizing selected displacements of a designated anatomical structure, anchored to the set L of landmarks, comprising elastic bodies and/or a plurality of independent rigid bodies in a sequence of image datasets.

In an embodiment of the registration method according to the invention, the registration method comprises a coordinate-selecting step for selecting a system of coordinates in the first image dataset. A common choice of the coordinate system is a Cartesian coordinate system. Advantageously, the coordinate-selecting step enables selecting an origin and axes of the Cartesian system. The choice of the axes of the Cartesian coordinate system determines, in combination with the selection of weights, which displacements of landmarks in the second image dataset are going to be optimized.

In a further embodiment of the registration method according to the invention, a rigid transformation is used for registering the second image dataset within the registering step. There are many families of transformations that can be used to optimize various displacements in a sequence of images rendered from a sequence of image datasets. However, rigid transformations are often a preferred choice because they do not deform structures in an image dataset while being sufficient to compensate many common displacements—translations, rotations, and combinations thereof—of a designated anatomical structure in the second image dataset relative to the designated anatomical structure in the first image dataset.

In a further embodiment of the registration method according to the invention, the weight-assigning step further comprises assigning a first zero-weight substantially equal to zero to a first coordinate of a certain landmark of the set of landmarks, thereby optimizing a displacement of the certain landmark in the second image dataset relative to the certain landmark in the first image dataset, said displacement being substantially perpendicular to a first coordinate axis of the system of coordinates. This embodiment is especially useful for compensating the in-plane displacements of a designated anatomical structure.

In a further embodiment of the registration method according to the invention, the weight-assigning step further comprises assigning a second zero-weight substantially equal to zero to a second coordinate of the certain landmark, thereby optimizing the displacement of the certain landmark in the second image dataset relative to the certain landmark in the first image dataset, said displacement being substantially perpendicular to a second coordinate axis of the system of coordinates. This embodiment is especially useful for compensating off-plane displacements of a designated anatomical structure.

In a further embodiment of the registration method according to the invention, the registration method comprises a rendering step for rendering a view from the second image dataset on the basis of the registration of the second image dataset with the first image dataset. Thus, a medical practitioner can visually compare two corresponding views of a designated anatomical structure, such as a joint, at different geometric configurations, physiological states, or phases of motion.

In a further embodiment of the registration method according to the invention, the registration method comprises an iteration step for rendering a sequence of views from a sequence of image datasets in a cine format where the first image dataset is selected from the sequence of image datasets and the second image dataset is iteratively selected from the sequence of image datasets. Thus, a medical practitioner can visually trace a sequence of corresponding views of a designated anatomical structure, such as a joint, at different configurations, states or phases, in a cine format.

It is a further object of the invention to provide a registration system of the kind described in the opening paragraph that can be used for optimizing selected displacements of a designated anatomical structure comprising elastic bodies and/or a plurality of independent rigid bodies in a sequence of image datasets. This is achieved in that the registration system for registering a second image dataset with a first image dataset on the basis of a set of landmarks comprises:

a weight-assigning unit for assigning a weight to each coordinate of each landmark from the set of landmarks; and a registering unit for registering the second image dataset with the first image dataset on the basis of the weight assigned to the each coordinate.

It is a further object of the invention to provide an image acquisition system of the kind described in the opening paragraph that can be used for optimizing selected displacements of a designated anatomical structure comprising elastic bodies and/or a plurality of independent rigid bodies in a sequence of image datasets. This is achieved in that the image acquisition system comprises a registration system for registering a second image dataset with a first image dataset on the basis of a set of landmarks, the registration system comprising:

a weight-assigning unit for assigning a weight to each coordinate of each landmark from the set of landmarks; and a registering unit for registering the second image dataset with the first image dataset on the basis of the weight assigned to the each coordinate.

It is a further object of the invention to provide a workstation of the kind described in the opening paragraph that can be used for optimizing selected displacements of a designated anatomical structure comprising elastic bodies and/or a plurality of independent rigid bodies in a sequence of image datasets. This is achieved in that the workstation comprises a registration system for registering a second image dataset with a first image dataset on the basis of a set of landmarks, the registration system comprising:

a weight-assigning unit for assigning a weight to each coordinate of each landmark from the set of landmarks; and a registering unit for registering the second image dataset with the first image dataset on the basis of the weight assigned to the each coordinate.

It is a further object of the invention to provide a computer program product of the kind described in the opening paragraph that can be used for optimizing selected displacements of a designated anatomical structure comprising elastic bodies and/or a plurality of independent rigid bodies in a sequence of image datasets. This is achieved in that the computer program product to be loaded by a computer arrangement, comprising instructions for registering a second image dataset with a first image dataset on the basis of a set of landmarks, the computer arrangement comprising a processing unit and memory, the computer program product, after being loaded, provides said processing unit with the capability to carry out the following tasks:

assigning a weight to each coordinate of each landmark from the set of landmarks; and registering the second image dataset with the first image dataset on the basis of the weight assigned to the each coordinate.

Modifications and variations thereof, of the registration system, of the image acquisition system, of the workstation, and/or of the computer program product, which correspond to modifications of the registration method and variations thereof, being described, can be carried out by a skilled person on the basis of the present description.

The registration method of the present invention is especially useful for registering multidimensional image datasets, in particular 3D image datasets. The image dataset can be obtained from any of the many imaging modalities such as Magnetic Resonance Imaging (MRI)), Computed Tomography (CT), Ultrasound, Positron Emission Tomography (PET), and Single Photon Emission Computed Tomography (SPECT).

These and other aspects of the registration method, of the registration system, of the image acquisition system, of the workstation, and of the computer program product according to the invention will become apparent from and will be elucidated with respect to the implementations and embodiments described hereinafter and with reference to the accompanying drawings, wherein.

Figure 3:
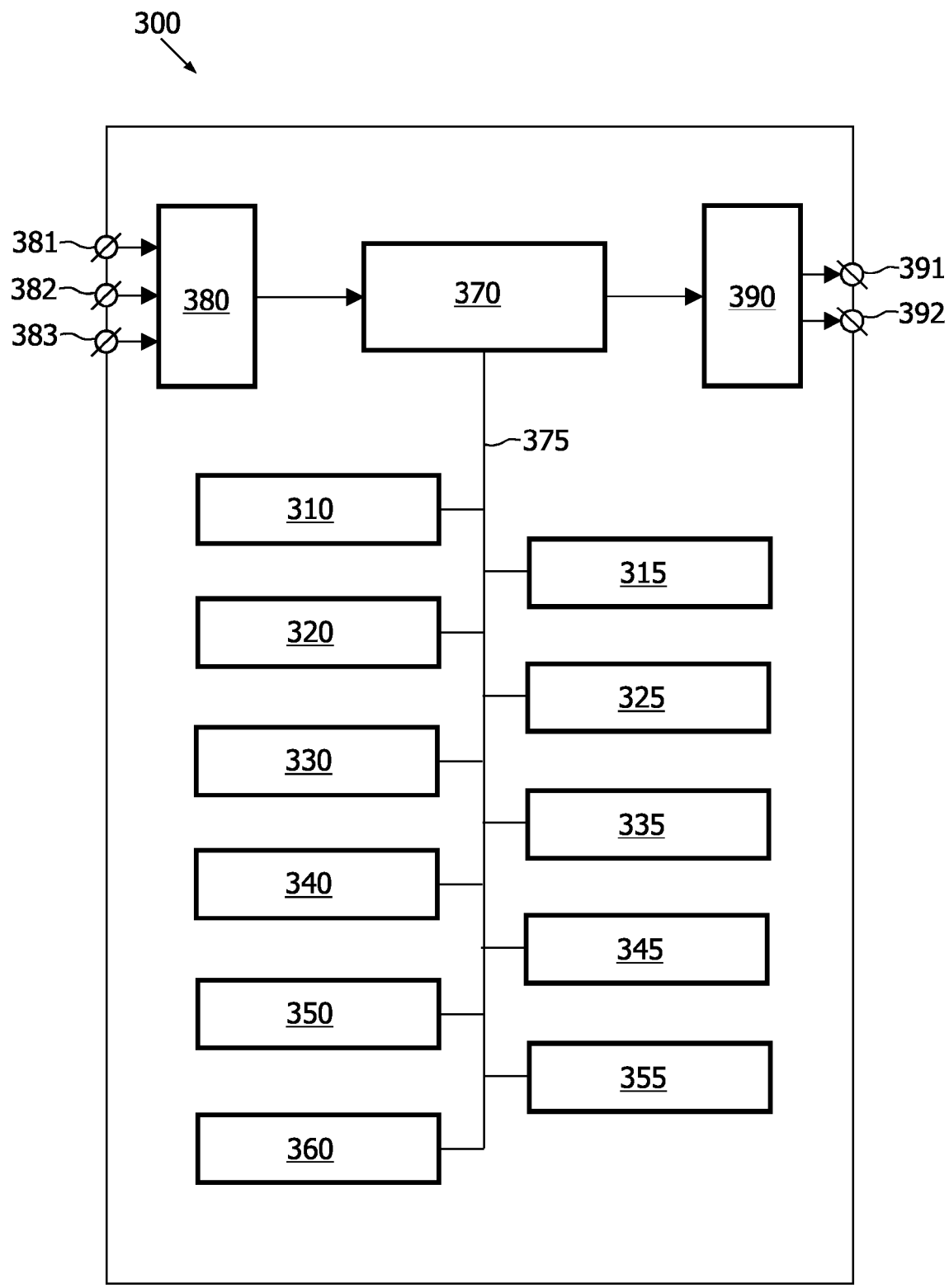
Figure 4:
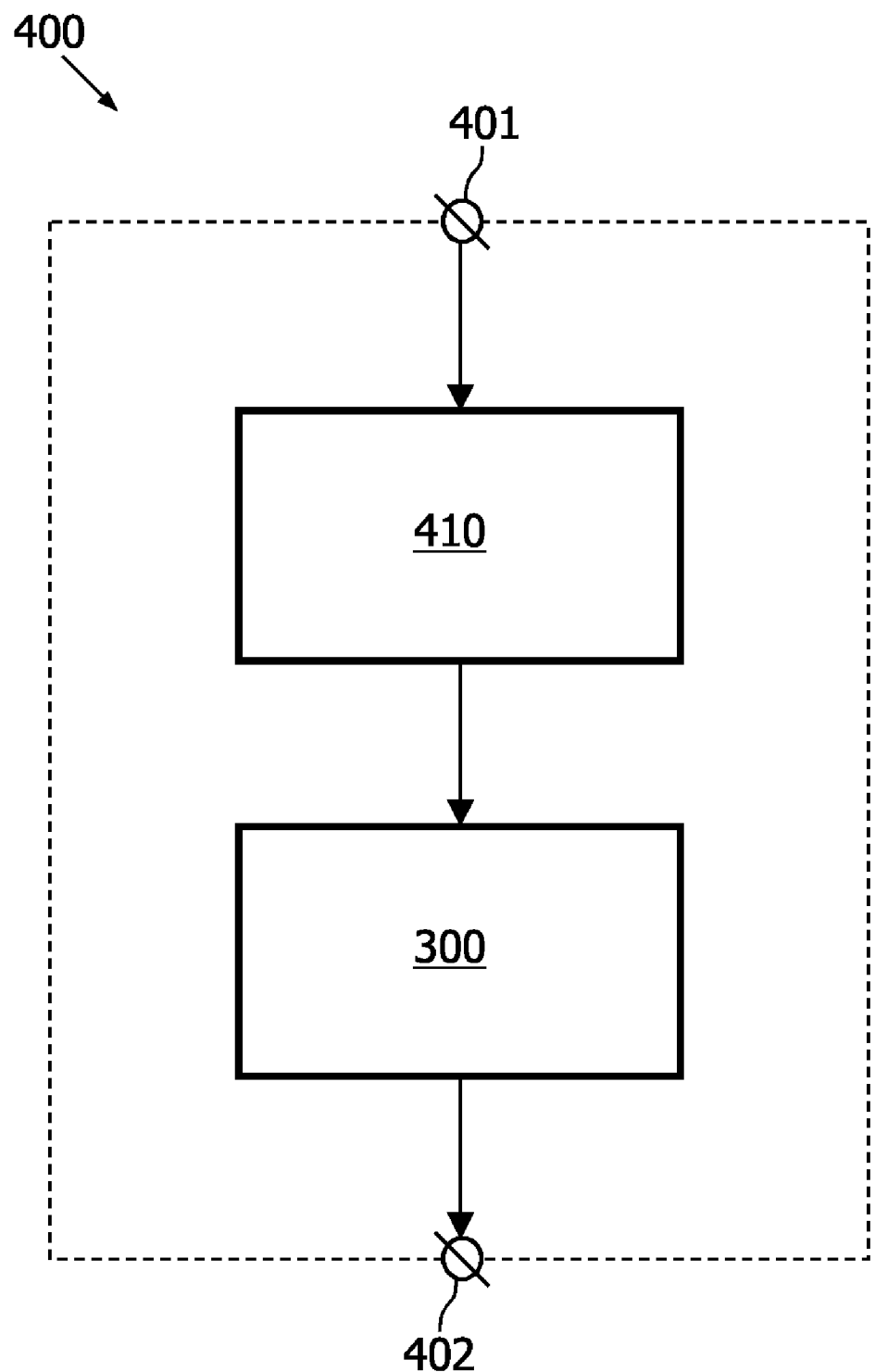

FIG. 3 schematically shows an embodiment of the registration system;

FIG. 4 schematically shows an embodiment of the image acquisition system; and

Figure 5:
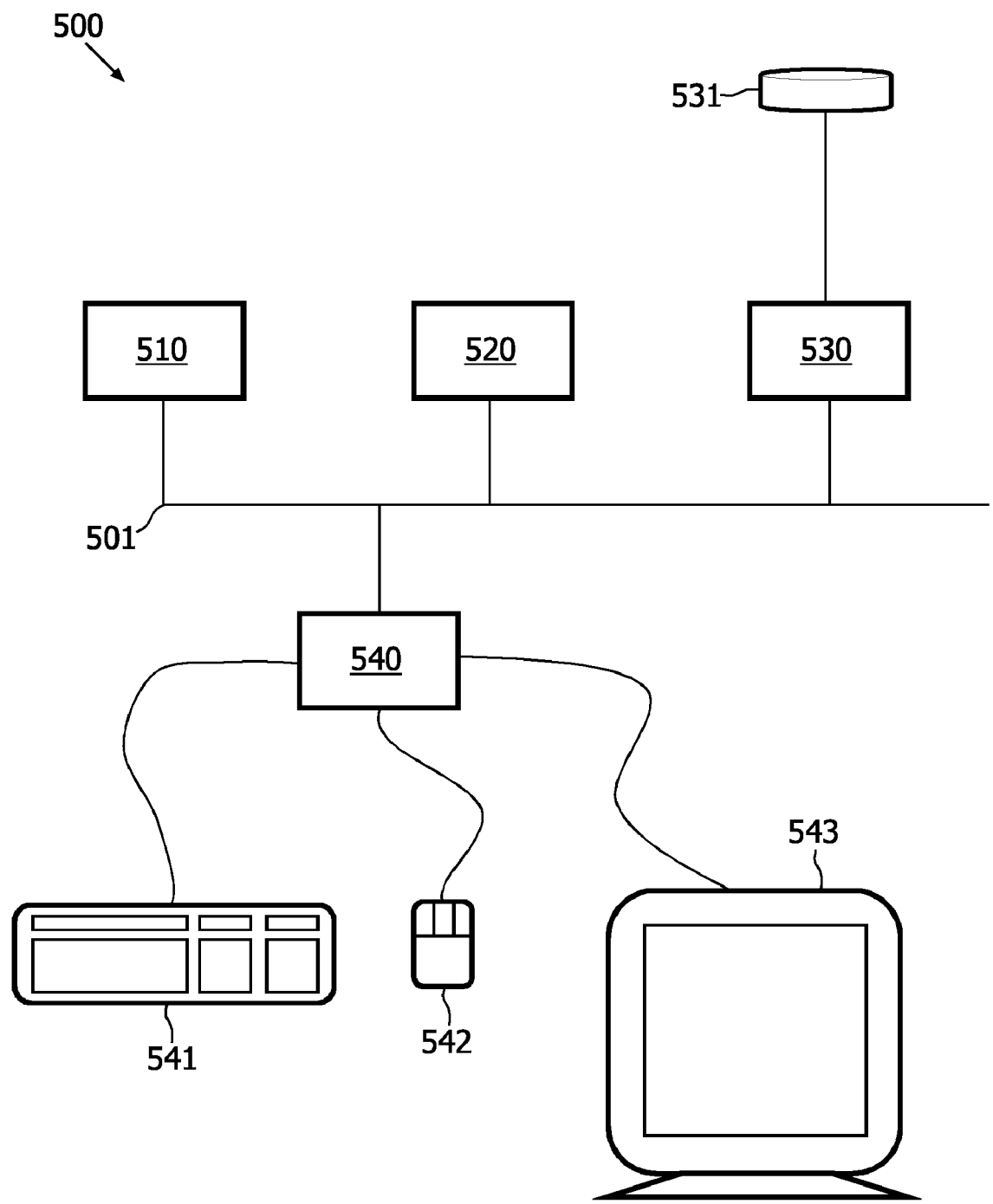

FIG. 5 schematically shows an embodiment of the workstation.

Same reference numerals are used to denote similar parts throughout the figures.

Figure 1:
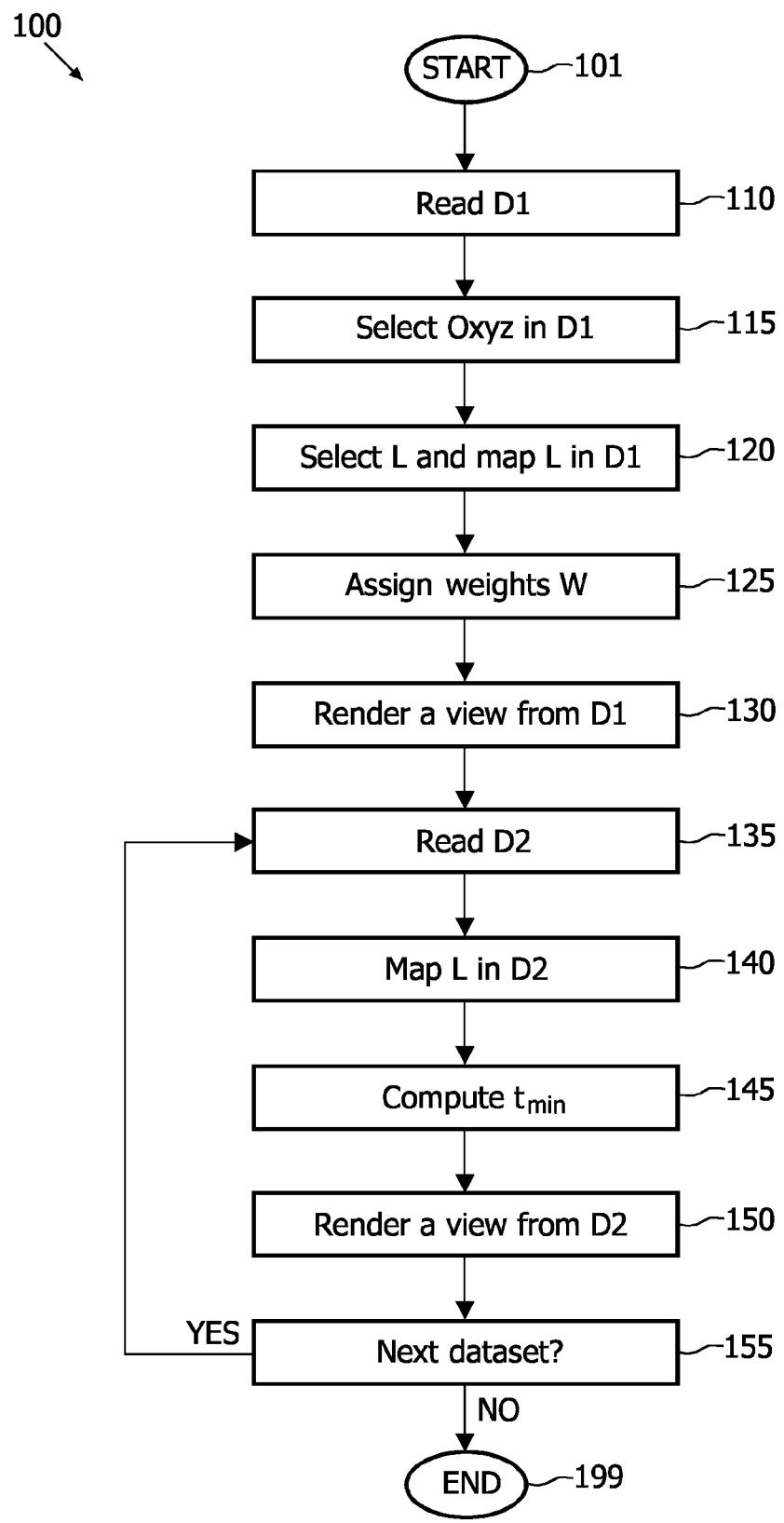
FIG. 1 shows a simplified flowchart of an embodiment of the registration method.

FIG. 1 shows a simplified flowchart of an embodiment of the registration method 100 of registering a second image dataset with a first image dataset on the basis of a set of landmarks, said registration method 100 comprising:

a weight-assigning step 125 for assigning a weight to each coordinate of each landmark from the set of landmarks; and a registering step 145 for registering the second image dataset with the first image dataset on the basis of the weight assigned to the each coordinate.

Optionally, the registering method 100 further comprises:

a coordinate-selecting step 115 for selecting a system of coordinates in the first image dataset;

a rendering step 150 for rendering a view from the second image dataset on the basis of the registration of the second image dataset with the first image dataset; and an iteration step 155 for rendering a sequence of views from a sequence of image datasets in a cine format where the first image dataset is selected from the sequence of image datasets and the second image dataset is iteratively selected from the sequence of image datasets.

Referring to FIG. 1, the start step 101 labeled "START" comprises initialization tasks. In the initial reading step 110 labeled "Read D1", the first image dataset D1 is obtained. Optionally, a preferred system of coordinates, for example a Cartesian system of coordinates, is selected in the coordinate-selecting step 115 labeled "Select Oxyz in D1". Next, a set L of landmarks is selected and locations of landmarks in the first image dataset are found in the landmark-selecting step 120 labeled "Select L and map L in D1". Then a weight is assigned to each coordinate of each landmark in the weight-assigning step 125 labeled "Assign weights W". In the optional initial rendering step 130 labeled "Render a view from D1", a viewing plane is selected and a cross-section view is rendered from the first image dataset D1. In the reading step 135 labeled "Read D2" a second image dataset D2 is obtained. Next, locations of landmarks from the set of landmarks L are mapped into the second image dataset D2 in the landmark-mapping step 140 labeled "Map L in D2". These landmarks are used to compute the optimal transformation $t_{min}$ for registering the second image dataset D2 with the first image dataset on the basis of the assigned weights by optimizing an objective function $F_L(t)$ in the registering step 145 labeled "Compute $t_{min}$". The computation of the optimal transformation $t_{min}$ may comprise a search for an optimum of the objective function $F_L(t)$. The optimized transformation $t_{min}$ may be used in the optional rendering step 150 labeled "Render a view from D2" to render a cross-section view from the image dataset D2, corresponding to the cross-section view rendered from the first image dataset in the initial rendering step 130. The optional iteration step 155 labeled "Next dataset?" is arranged to perform a check of an iteration condition. If the result of the check of the condition performed in the iteration step 155 is positive, a new iteration cycle begins with the reading step 135. If the result of the check of the condition performed in the iteration step 155 is negative, the end step 199 labeled "END" comprising termination tasks is executed and the method terminates.

In an embodiment of the registering method 100 according to the invention, the registering method 100 comprises a coordinate-selecting step 115 for selecting a system of coordinates in the first image dataset. This step determines, together with the weights assigned to them in the weight-assigning step 125, which displacement will be optimized and which displacements will remain not optimized. Therefore choosing the best system of coordinates is an important step of the registration method 100.

In the landmark-selecting step 120 a set L of landmarks is identified. It is a common practice to define the set L on the basis of the first image dataset. Optionally, a map of the set L in the first image dataset can be obtained from a first landmark dataset associated with the first image dataset. A landmark l from the set L can belong to a designated anatomical structure in the first image dataset or can be selected outside the designated anatomical structure. Optionally, a physical marker, which is easy to detect in the acquired image dataset, can be used. In this case a location of the physical marker can be used directly as a location of the respective landmark.

In the weight-assigning step 125 each coordinate of each landmark is assigned its own weight. Each coordinate of each landmark may contribute to the optimal transformation $t_{min}$ for registering the second image dataset with the first image dataset. The weight-assigning step 125 allows controlling the contribution of each coordinate of each landmark. This step also allows selecting coordinates of landmarks in the second image dataset, which are going to be optimized in the registering step. Each weight is applied to a predefined term of the expression of the objective function, which term depends on the respective coordinate of the transformed landmark in the second image dataset. The range of weight values may be predefined. The weights may assume arbitrary numerical values within the predefined range. Optionally, the weight assigning step may comprise selecting the term of the expression of the objective function which is to be multiplied by a particular weight. Preferably the weights assume default values, which are applied to the respective terms of the expression of the objective function unless modified. Optionally some weights can be predefined. Significance of the weight-assigning step will become apparent from the discussion of the registering step 145 and from embodiments of the current invention.

In an embodiment of the registration method 100 according to the invention, the weights can assume only two values: 0 and 1. The default weight values are 1. This value may be changed to zero for any coordinate of any landmark.

In an embodiment of the registration method 100 according to the invention the weight-assigning step 125 further comprises assigning a first zero-weight substantially equal to zero to a first coordinate of a certain landmark of the set of landmarks, thereby optimizing a displacement of the certain landmark in the second image dataset relative to the certain landmark in the first image dataset, said displacement being substantially perpendicular to a first coordinate axis of the system of coordinates. This embodiment is especially useful for optimizing in-plane displacements of a designated anatomical structure. For example, for 3D image datasets, if the weight corresponding to the z-coordinate of each landmark is set to zero, the optimal transformation tends to optimize the in-plane displacements substantially parallel to the xy-plane, while the off-plane displacements substantially parallel to the z-axis are not optimized.

In an embodiment of the registration method 100 according to the invention, the weight-assigning step 125 further comprises assigning a second zero-weight substantially equal to zero to a second coordinate of the certain landmark, thereby optimizing the displacement of the certain landmark in the second image dataset relative to the certain landmark in the first image dataset, said displacement being substantially perpendicular to a second coordinate axis of the system of coordinates. This embodiment is especially useful for compensating off-plane displacements of a designated anatomical structure. For example, for 3D image datasets, if the weights corresponding to the x-coordinate and to the y-coordinate of each landmark are set to zero, the optimal transformation tends to optimize the displacements substantially parallel to the z-axis, while the in-plane displacements substantially parallel to the xy-plane are not optimized.

In the landmark-mapping step 140 the set L of landmarks is mapped into the second image dataset. Preferably the mapping is done automatically, for example, by using elastic image registration method for elastically registering the first image dataset with the second image dataset. A method of elastic registration of images is described in an article entitled "B-spline registration of 3D images with Levenberg-Marquardt optimization" by S. Kabus et al, Proceedings of the SPIE 2004, Fitzpatrick J. M. and Sonka M. (eds), 5370, 304-313, 2004. Physical markers can be used in order to improve the elastic image registration. Alternatively, if physical markers are used as landmarks, the locations of markers in the second image dataset define the landmark locations in the second image dataset. Optionally, a mapping of the set L in the second image dataset can be obtained from a second landmark dataset associated with the second image dataset.

In the registering step 145 the optimal transformation $t_{min}$ for registering the second image dataset with the first image dataset is computed by optimizing the objective function $F_L(t)$. The computation of the optimal transformation $t_{min}$ comprises a search for a minimum of the objective function $F_L(t)$. A useful objective function $F_L(t)$ for 3D image datasets, defined by Eq. 2, can be obtained using the following similarity function:

$$S_L(p(l_1), \ldots, p(l_n); q(l_1), \ldots, q(l_n)) = \sum_{l \in L} [w_x(l)(p_x(l) - q_x(l))^2 + w_y(l)(p_y(l) - q_y(l))^2 + w_z(l)(p_z(l) - q_z(l))^2],$$ Eq. 3

Here $w_x(l)$, $w_y(l)$, $w_z(l)$ are the three weights, components of a weight vector $w(l)$, corresponding to the Cartesian coordinates of a landmark $l \in L$. The expression in square brackets defines a distance between the location $p=(p_x(l), p_y(l), p_z(l))$ of landmark l in the first image dataset and the transformed location $tq=((tq)_x(l), (tq)_y(l), (tq)_z(l))$ of landmark l in the second image dataset if all three weights $w_x(l), w_y(l), w_z(l)$ are non-zero. If any of these weights is 0 then the expression in square brackets is a pseudo-distance. If all three weights $w_x(l), w_y(l), w_z(l)$ are equal to 1, the expression in square brackets is the Euclidean distance. The domain T of the objective function comprises predetermined transformations t. Examples of the domain T comprise, but are not limited to, the set of translations, the set of orthogonal transformations, and the set of affine transformations. If a certain weight of a certain coordinate of a certain landmark in a first objective function, defined by the similarity function of Eq. 3, is less than the certain weight of the certain coordinate of the certain landmark in a second objective function, defined by the similarity function of Eq. 3, it results from Eq. 3 that the optimal transformation $t_{min}$ will be less sensitive to the changes in the certain coordinate of the certain landmark in the first objective function than in the second objective function. In particular, if the certain weight is zero then the optimal transformation $t_{min}$ does not depend on the certain coordinate of the certain landmark. This feature is especially useful for compensating the in-plane and/or the off-plane displacements of designated anatomical structures.

In an embodiment of the registration method according to the invention, the domain of the objective function comprises rigid transformations. Rigid transformations comprise translations, rotations, and combinations thereof. Rigid transformations are often a preferred choice because they do not deform structures comprised in an image dataset. Rigid transformations are also easy to implement and sufficient to compensate many common displacements—translations, rotations, and combinations thereof—of a designated anatomical structure in the second image dataset relative to the designated anatomical structure in the first image dataset. Alternatively, other families of transformations, such as affine transformations, can be employed for image registration in the registering step 145. Affine transformations allow optimizing dilations, contractions and extensions, in addition to compensating rigid displacements.

It is worth pointing out that in the description of the current invention the terms "registration" and "registering" refer to determining the optimal transformation $t_{min}$ for registering the second image dataset with the first image dataset. This is an essential step of image registration. However, the actual transformation of the second image dataset to superpose it with the first image dataset does not need to be carried out. The optimal transformation is used to render an advantageous view from the second image dataset as described in the description of the rendering step 150. Still, the differences between the locations of landmarks in the first image dataset and in the second image dataset are referred to as displacements, even though the views from the first image dataset and the corresponding view from the second image dataset may be rendered and displayed separately.

A further common example of a similarity function useful for defining an objective function for 3D image datasets on the basis of Eq. 2 is:

$$S_L^{(1)}(p(l_1), \ldots, p(l_n); q(l_1), \ldots, q(l_n)) = \sum_{l \in L} [w_x(l)|p_x(l) - q_x(l)| + w_y(l)|p_y(l) - q_y(l)| + w_z(l)|p_z(l) - q_z(l)|],$$ Eq. 4

Here the expression in the square brackets is another distance and/or pseudo-distance between the location $p=(p_x(l), p_y(l), p_z(l))$ of landmark l in the first image dataset and the location $q=(q_x(l), q_y(l), q_z(l))$ of landmark l in the second image dataset.

Another common example of a similarity function useful for defining an objective function for 3D image datasets on the basis of Eq. 2 is:

$$S_L^{(2)}(p(l_1), \ldots, p(l_n); q(l_1), \ldots, q(l_n)) = \qquad \text{Eq. 7}$$
$$\sum_{l \in L} [\max\{w_x(l)|p_x(l) - q_x(l)|, w_y(l)|p_y(l) - q_y(l)|, w_z|p_z(l) - q_z(l)|\}].$$

Here the expression in the square brackets is yet another distance and/or pseudo-distance between the location $p=(p_x(l), p_y(l), p_z(l))$ of landmark l in the first image dataset and the location $q=(q_x(l), q_y(l), q_z(l))$ of landmark l in the second image dataset.

Yet another example of a similarity function useful for defining an objective function for 3D image datasets on the basis of Eq. 2 is:

$$S_L^{(3)}(p(l_1), \ldots, p(l_n); q(l_1), \ldots, q(l_n)) = \qquad \text{Eq. 6}$$
$$\sum_{l \in L} [\exp(-w_x(l)(p_x(l) - q_x(l))^2 -$$
$$w_y(l)(p_y(l) - q_y(l))^2 - w_z(l)(p_z(l) - q_z(l))^2)],$$

Here the expression in the square brackets is an exponential function of a distance and/or pseudo-distance between the location $p=(p_x(l), p_y(l), p_z(l))$ of landmark l in the first image dataset and of the location $q=(q_x(l), q_y(l), q_z(l))$ of landmark l in the second image dataset. The maximum of this exponential function corresponds to identical coordinates of landmark l in the first image dataset and in the second image dataset.

The skilled person will understand that there are many similarity functions $S_L(p(l_1), \ldots, p(l_n); q(l_1), \ldots, q(l_n))$ useful for defining an objective function $F_L(t)$ according to Eq. 2, and that the similarity functions $S_L(p(l_1), \ldots, p(l_n); q(l_1), \ldots, q(l_n))$ described in the description of the embodiments, illustrate the present invention and do not limit the scope of the claims. The described embodiments for 3D image datasets can be generalized to multidimensional image datasets, such a generalization being a routine task for the skilled person.

Alternative definition of the objective function and/or of the optimization method is also possible. For example, one can define two objective functions:

$$F_L^z(t) = \sum_{l \in L} \lfloor w_z(l)(p_z(l) - (tq)_z(l))^2 \rfloor \text{ and} \qquad \text{Eq. 7}$$

$$F_L^{xy}(t) = \sum_{l \in L} \lfloor w_x(l)(p_x(l) - (tq)_x(l))^2 + w_y(l)(p_y(l) - (tq)_y(l))^2 \rfloor, \qquad \text{Eq. 8}$$

which can be optimized in two steps. In the first step, a rigid transformation $t_{z\text{-}min}$, for which the first objective function $F_L^z(t)$ attains a minimum, is computed. In the second step, a rigid transformation $t_{xy\text{-}min}$, for which the second objective function $F_L^{xy}(t)$ attains a minimum, is computed. The optimal transformation $t_{min}$ is the composition of the two transformations: $t_{min} = t_{xy\text{-}min} \circ t_{z\text{-}min}$. The skilled person will understand that the objective function and the optimization method employed in the description of the embodiments of the invention illustrate the present invention and do not limit the scope of the claims.

The skilled person will appreciate that the computation of the optimized transformation $t_{min}$ can be done in any system of coordinates after required modifications to the expression of the objective function and to the similarity function are made. For example, if $e_x$, $e_y$, $e_z$ are three substantially mutually orthogonal unit vectors defining the three axes of a coordinate system associated with the weighs $w_x(l)$, $w_y(l)$, $w_z(l)$ then Eq. 3 is equivalent to $$S_L(p(l_1), \ldots, p(l_n); q(l_1), \ldots, q(l_n)) = \qquad \text{Eq. 9}$$
$$\sum_{l \in L} [w_x(l)(\langle e_x, p(l) \rangle - q_x(l))^2 +$$
$$w_y(l)(\langle e_y, p(l) \rangle - q_y(l))^2 + w_z(l)(\langle e_z, p(l) \rangle - q_z(l))^2]$$

where the scalar products of the unit vectors $e_x$, $e_y$, $e_z$ by the location vector p(l) are coordinates of the location vector in the Cartesian coordinate system defined by the unit vectors:

$$\langle e_x, p(l) \rangle = p_x(l)$$

$$\langle e_y, p(l) \rangle = p_y(l),$$

$$\langle e_z, p(l) \rangle = p_z(l).$$

Hence, a convenient Cartesian coordinate system can be used for representing the coordinates of the unit vectors $e_x$, $e_y$, $e_z$ and of the landmark locations p(l). For example, a convenient Cartesian coordinate system may be the system employed to represent locations of elements of the first image dataset. An advantage of using this system of coordinates is that the first image dataset does not need to be resampled in the system of coordinates defined by the unit vectors $e_x$, $e_y$, $e_z$. A disadvantage of using a convenient system of coordinates is that the objective function becomes more computationally intensive. The skilled person will understand, that there are many possible the mathematical formulations of the solution to the problem solved by the current invention, and that the mathematical formulations used in the description of the current invention do not limit the scope of the claims.

In an embodiment of the registering method 100 according to the invention, the registering method 100 comprises a rendering step 150 for rendering a view from the second image dataset on the basis of the registration of the second image dataset with the first image dataset. A first view is a cross-section view rendered from the first image dataset and defined by a viewing plane P selected in the initial rendering step 130. A second view is a cross-section view rendered from the second image dataset and defined by a viewing plane $t_{min}^{-1}(P)$. The viewing plane $t_{min}^{-1}(P)$ is a plane substantially equal to the plane P transformed using the inverse of the optimal transformation $t_{min}$ computed in the registering step 145. This plane defines a view, which is useful for comparing the view rendered from the first image dataset with the view rendered from the second image dataset. Alternatively, the second image dataset can be transformed using the optimal transformation $t_{min}$. In this case the second cross-section view rendered from the transformed second image dataset is defined by the viewing plane P.

Alternatively, a projection view such as Maximum Intensity Projection (MIP) and Minimum Intensity Projection (MinIP) can be rendered from the first image dataset and from the second image dataset. In MIP the displayed pixel is set to the maximum intensity along the ray. In MinIP the displayed pixel is set to the minimum intensity along the ray. In the present embodiment each ray $t_{min}^{-1}(R)$ employed to render a view from the second image dataset is obtained from a ray R employed to render a view from the first image dataset by transforming R using the optimal transformation $t_{min}$ computed in the registering step 145. More information on this and other image rendering techniques can be found in Barthold Lichtenbelt, Randy Crane, and Shaz Naqvi, Introduction to Volume Rendering (Hewlett-Packard Professional Books) Prentice Hall; Bk&CD-Rom edition (1998). The scope of the claims is not restricted to any particular rendering method.

In an embodiment of the registering method 100 according to the invention, the registering method 100 comprises an iteration step 155 for rendering a sequence of views from a sequence of image datasets in a cine format where the first image dataset is selected from the sequence of image datasets and the second image dataset is iteratively selected from the sequence of image datasets. Thus, the registration method 100 of the present invention allows displaying the sequence of rendered views as a movie for an easy and fast comparison of designated anatomical structures, especially of moving structures. The iteration condition is, for example, that the second image dataset is not the last dataset in the sequence of image datasets. Optionally, other conditions may apply allowing, for example, a cyclic movie.

The optimal transformation $t_{min}$ computed in the registering step 145 allows registering the second image dataset, which is obtained anew in each iteration cycle in the reading step 125, with the first image dataset, which is obtained once in the initial reading step 110 before entering the iteration loop. The first image dataset may be the first dataset from the sequence of image datasets. Alternatively, the registering method 100 comprises an update step, in which the first image dataset is updated in each iteration cycle. After the optimal transformation $t_{min}(J)$ is computed on the basis of the first image dataset in the J-th iteration cycle, the first image dataset is replaced by the second image dataset. In other words, the first image dataset is the dataset from the sequence of image datasets, which was the second image dataset in the preceding iteration cycle. In this case the viewing plane for rendering a cross-section view from the second image dataset is an image of the viewing plane for rendering the cross-section view from the initial image dataset by the inverse of the composition $t_{min}(J) \circ t_{min}(J-1) \circ \ldots t_{min}(1)$. The skilled person will understand, that there are other ways of selecting the first image dataset from the sequence of image datasets.

The order of steps in the described embodiments of the method of the current invention is not mandatory, the skilled person may change the order of steps or perform steps concurrently using threading models, multi-processor systems or multiple processes when appropriate without departing from the concept as intended by the present invention. Optionally, two steps of the method of the current invention can be combined into one step. Optionally, a step of the method of the current invention can be split into a plurality of steps.

Figure 2:
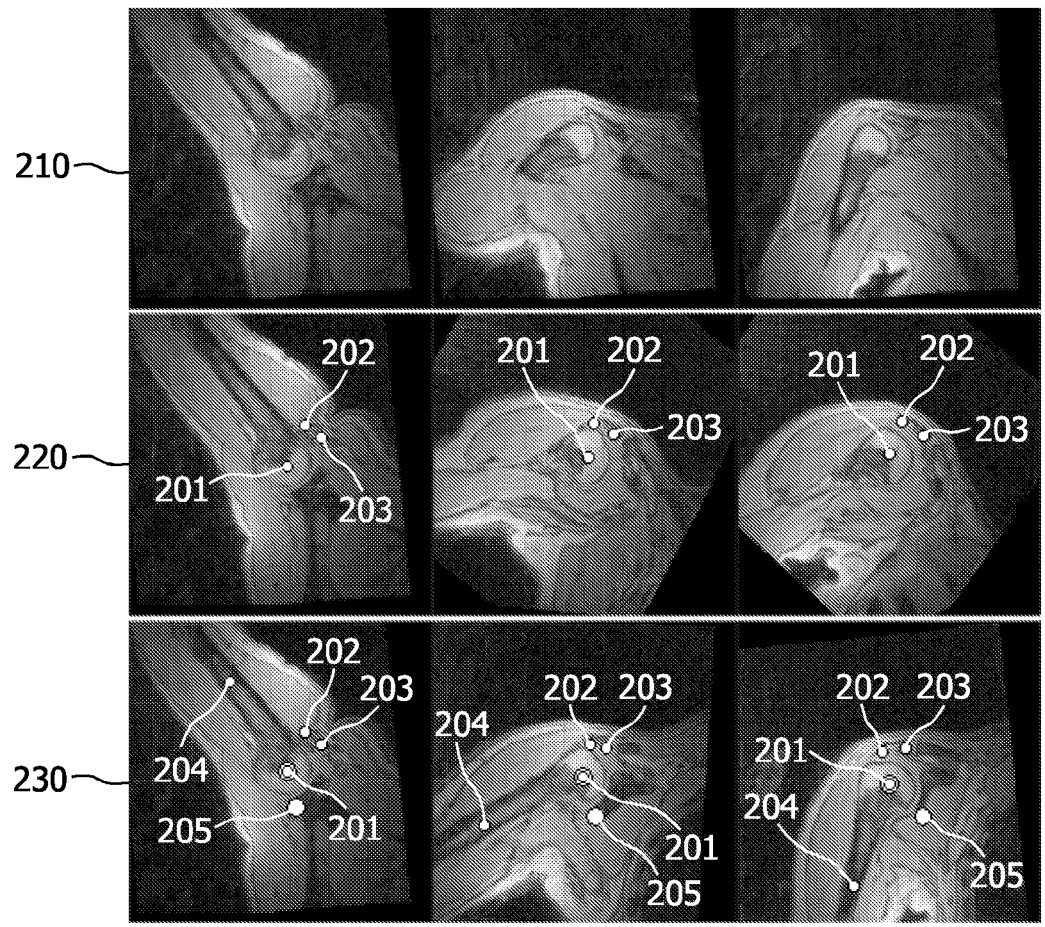
FIG. 2 shows three rows of views, each row showing three cross-section views rendered from a sequence of three 3D image datasets.

FIG. 2 shows three rows of views, each row comprising three cross-section views rendered from a sequence of three 3D image datasets. The top row shows views without displacement optimization, the middle row shows views with standard displacement optimization as described in Ref. 1, which is useful in case of a designated structure comprised in a single rigid body, and the bottom row shows views with off-plane and in-plane displacement optimization according to the current invention. The images illustrate a humerus joint at various configurations. The humerus, and selected parts of the clavicle and scapula are comprised in the designated anatomical structure.

The top row 210 of images in FIG. 2 comprises three cross-section views rendered without displacement optimization. The views shown in the second and third image are independent of the view in the first image. All views are rendered by applying the same viewing plane to each image dataset from the sequence of three 3D image datasets. Therefore, the three images are difficult to compare to each other because the humerus comprised in the designated anatomical structure is displaced off the viewing plane in the second and in the third view, and the shoulder is rotated.

The middle row 220 of images in FIG. 2 comprises three cross-section views rendered after carrying out an optimization of landmark displacements as described in Ref. 1. To this end, a set of three landmarks 201, 202 and 203, shown in the images as white circles, is selected: the first landmark 201 at the cap of the humerus, and the second landmark 202 and the third landmark 203 in the clavicle. This set is mapped into the image datasets. The three landmarks 201, 202 and 203 are lying in the viewing plane of the first middle row image and specify the designated anatomical structure that should stay inside the viewing plane in the subsequent images. The system of coordinates in the first image dataset is chosen in such a way that the z-axis of the Cartesian coordinate system is substantially perpendicular to the plane defined by the three landmarks 201, 202 and 203. The weights $w_x(l)$, $w_y(l)$ and $w_z(l)$ of all three landmarks 201, 202 and 203 are set to 1. The optimal transformation $t_{min}(2 \rightarrow 1)$ for registering the second image dataset with the first image dataset is computed by minimizing the objective function defined by Eq. 1 and Eq. 2. Similarly, the optimal transformations $t_{min}(3 \rightarrow 2)$ for registering the third image dataset with the second image dataset is computed by minimizing the objective function defined by Eq. 1 and Eq. 2. The viewing plane of the second view is obtained by transforming the viewing plane of the first view using the inverse of the optimal transformations $t_{min}(2 \rightarrow 1)$. The viewing plane of the third view is obtained by transforming the viewing plane of the second view by the inverse of the optimal transformations $t_{min}(3 \rightarrow 2)$. As a result of such an optimization of landmark displacements, the three landmarks 201, 202 and 203 are substantially lying in the viewing planes of the second and of the third image dataset from the sequence in the same location of the rendered views. However, the humerus disappears from the second and from the third cross-section view. This undesirable effect results from the choice of landmarks. The locations of landmarks relative to each other are substantially the same in all three images. Such landmarks are useful in case of a designated structure comprised in a single rigid body, which is not the case of the present example comprising multiple bones.

The bottom row of images in FIG. 2 comprises three cross-section views rendered after carrying out an optimization of the off-plane displacements and of the in-plane displacements. To this end, five landmarks, marked in the images by smaller and larger white circles, are selected and mapped into the image datasets. The three landmarks 201, 202 and 203 are the same as in those in the middle row 220. The fourth landmark 204 is located in the humerus away from the cap. The fifth landmark 205 is located in the scapula. These landmarks anchor the designated anatomical structure that should stay in the viewing plane. Also, the shoulder should not rotate in the viewing plane. The smaller circles mark the three landmarks 202, 203 and 204 used for the optimization of the off-plane displacements as shown. The system of coordinates in the first image dataset is chosen in such a way that the z-axis of the Cartesian coordinate system is substantially perpendicular to the plane defined by the three landmarks. The weights $w_x(l)$ and $w_y(l)$ of the three landmarks 202, 203 and 204 are set to 0. The two landmarks 201 and 205 are marked by the larger circles. These landmarks are used to optimize the displacement of the structure in the viewing plane. The weights $w_z(l)$ the two landmarks 201 and 205 are set to 0. The optimal transformation $t_{min}(2 \rightarrow 1)$ for registering the second image dataset with the first image dataset is computed by minimizing the objective function defined by Eq. 2 and Eq. 3. Similarly, the optimal transformation $t_{min}(3 \rightarrow 2)$ for registering the third image dataset with the second image dataset is computed by minimizing the objective function defined by Eq. 2 and Eq. 3. The viewing plane of the second view is obtained by transforming the viewing plane of the first view using the inverse of the optimal transformations $t_{min}(2 \rightarrow 1)$. The viewing plane of the third view is obtained by transforming the viewing plane of the second view by the inverse of the optimal transformations $t_{min}(3 \rightarrow 2)$. As a result of such an optimization of landmark displacements, the three smaller landmarks are substantially lying in the viewing planes of the second and of the third image dataset from the sequence. Thus interesting details of the designated anatomical structure are visible despite the fact that humerus is in a different position relative to the shoulder in each of the three images of the bottom row 230. Moreover, the shoulder is substantially not rotated because the in-plane displacements of landmarks are also optimized.

Although all landmarks in FIG. 2 are selected in the viewing plane of the first image dataset, the skilled person will understand that they can be also selected outside the viewing plane.

FIG. 3 schematically shows an embodiment of the registration system 300 for registering a second image dataset with a first image dataset on the basis of a set of landmarks, said registration system 300 comprising:

a initial reading unit 310 for reading the first image dataset;

a coordinate-selecting unit 315 for selecting a system of coordinates in the first image dataset;

a landmark-selecting unit 320 for selecting a set of landmarks and for mapping the set of landmarks into the first image dataset;

a weight-assigning unit 325 for assigning a weight to each coordinate of each landmark from the set of landmarks;

a initial rendering unit 330 for rendering a view from the first image dataset;

a reading unit 335 for reading the second image dataset;

a mapping unit 340 for mapping the set of landmarks into the second image dataset;

a registering unit 345 for registering the second image dataset with the first image dataset on the basis of the weight assigned to the each coordinate;

a rendering unit 350 for rendering a view from the second image dataset on the basis of the registration of the second image dataset with the first image dataset;

an iteration unit 355 for rendering a sequence of views from a sequence of image datasets in a cine format where the first image dataset is selected from the sequence of image datasets and the second image dataset is iteratively selected from the sequence of image datasets; and a user interface 360 for communicating with the registration system 300.

In the embodiment of the registering system 300 shown in FIG. 3, there are three input connectors 381, 382 and 383 for the incoming data. The first input connector 381 is arranged to receive data coming in from data storage such as a hard disk, a magnetic tape, flash memory, or an optical disk. The second input connector 382 is arranged to receive data coming in from a user input device such as a mouse or a touch screen. The third input connector 383 is arranged to receive data coming in from a user input device such as a keyboard. The input connectors 381, 382 and 383 are connected to an input control unit 380.

In the embodiment of the registering system 300 shown in FIG. 3, there are two output connectors 391 and 392 for the outgoing data. The first output connector 391 is arranged to output the data to data storage such as a hard disk, a magnetic tape, flash memory, or an optical disk. The second output connector 392 is arranged to output the data to a display device. The output connectors 391 and 392 receive the respective data via an output control unit 390.

The skilled person will understand that there are many ways to connect input devices to the input connectors 381, 382 and 383 and the output devices to the output connectors 391 and 392 of the registering system 300. These ways comprise, but are not limited to, a wired and a wireless connection, a digital network such as a Local Area Network (LAN) and a Wide Area Network (WAN), the Internet, a digital telephone network, and an analogue telephone network.

In an embodiment of the registering system 300 according to the invention, the registering system comprises a memory unit 370. The memory unit 370 is arranged to receive an input data from external devices via any of the input connectors 381, 382, and 383 and to store the received input data in the memory unit 370. Loading the data into the memory unit 370 allows a quick access to relevant data portions by the units of the registration system 300. The input data comprises the first image dataset and the second image dataset. The memory unit 370 can be implemented by devices such as a Random Access Memory (RAM) chip, a Read Only Memory (ROM) chip, and/or a hard disk. Preferably, the memory unit 370 comprises a RAM for storing the image dataset. The memory unit 370 is also arranged to receive data from and to deliver data to the units of the registering system 300 comprising the initial reading unit 310, the coordinate-selecting unit 315, the landmark-selecting unit 320, the weight-assigning unit 325, the initial rendering unit 330, the reading unit 335, the mapping unit 340, the registering unit 345, the rendering unit 350, the iteration unit 355, and the user interface 360 via the memory bus 375. The memory unit 370 is further arranged to make the data available to external devices via any of the output connectors 391 and 392. Storing the data from the units of the registration system 300 in the memory unit 370 advantageously improves the performance of the units of the registering system 300 as well as the rate of transfer of data from the units of the registering system 300 to external devices.

Alternatively, the registering system 300 does not comprise the memory unit 370 and the memory bus 375. The input data used by the registering system 300 is supplied by at least one external device, such as external memory or a processor, connected to the units of the registering system 300. Similarly, the output data produced by the registering system 300 is supplied to at least one external device, such as external memory or a processor, connected to the units of the registering system 300. The units of the registering system 300 are arranged to receive the data from each other via internal connections or via a data bus.

In a further embodiment of the registering system 300 according to the invention, the registration system 300 comprises a user interface 360 for communicating with the registering system 300. The user interface 360 comprises a display unit for displaying data to the user and a selection unit for making selections. Combining the registering system 300 with a user interface 360 allows the user to communicate with the registering system 300. The user interface 360 is arranged to display views rendered from the first image dataset to the user for selecting the set of landmarks. The user interface 360 is further arranged to display views rendered from datasets comprised in the sequence of datasets. The user interface 360 is further arranged to assist the assigning of weights to the coordinates of landmarks. Optionally, the user interface can comprise a plurality of modes of operation of the registering system 300 such as a static display mode and a cine display mode. The skilled person will understand that more functions can be advantageously implemented in the user interface 360 of the registration system 300.

Alternatively, the registration system can employ an external input device and/or an external display connected to the registration system 300 via the input connectors 382 and/or 383 and the output connector 392. The skilled person will also understand that there exist many user interfaces that can be advantageously comprised in the registering system 300 of the current invention.

FIG. 4 schematically shows an embodiment of the image acquisition system 400 employing the registration system 300 of the invention, said image acquisition system 400 comprising an image acquisition system unit 410 connected via an internal connection with the registration system 300, an input connector 401, and an output connector 402. This arrangement advantageously increases the capabilities of the image acquisition system 400 providing said image acquisition system 400 with advantageous image registration capabilities of the registration system 300. The registration capabilities may prove particularly useful when image acquisition system 400 is further arranged for an interactive image acquisition, thus enabling the operator to decide which data to acquire on the basis of the viewed images. Examples of image acquisition systems are, but not limited to, a CT system, an X-ray system, an MRI system, an Ultrasound system, a Positron Emission Tomography (PET) system, and a Single Photon Emission Computed Tomography (SPECT) system.

FIG. 5 schematically shows an embodiment of the workstation 500. The system comprises a system bus 501. A processor 510, a memory 520, a disk input/output (I/O) adapter 530, and a user interface (UI) 540 are operatively connected to the system bus 501. A disk storage device 531 is operatively coupled to the disk I/O adapter 530. A keyboard 541, a mouse 542, and a display 543 are operatively coupled to the UI 540. The registration system 300 of the invention, implemented as a computer program, is stored in the disk storage device 531. The workstation 500 is arranged to load the program and input data into memory 520 and execute the program on the processor 510. The user can input information to the workstation 500 using the keyboard 541 and/or the mouse 542. The workstation is arranged to output information to the display device 543 and/or to the disk 531. The skilled person will understand that there are numerous other embodiments of the workstation known in the art and that the present embodiment serves the purpose of illustrating the invention and must not be interpreted as limiting the invention to this particular embodiment.

The registration system 300, such as the one shown in FIG. 3, of the invention may be implemented as a computer program product and can be stored on any suitable medium such as, for example, magnetic tape, magnetic disk, or optical disk. This computer program can be loaded into a computer arrangement comprising a processing unit and a memory. The computer program product, after being loaded, provides the processing unit with the capability to carry out the rendering, tasks.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the system claims enumerating several units, several of these units can be embodied by one and the same item of hardware or software. The usage of the words first, second and third, et cetera does not indicate any ordering. These words are to be interpreted as names.

The invention claimed is:

1. A registration method of registering a second image dataset from an imaging system with a first image dataset from the imaging system based on a set of landmarks, wherein a landmark is a region of interest in the first or second image datasets, said registration method comprising:
   a weight-assigning step for assigning with a computer a weight to each coordinate of each landmark from the set of landmarks, wherein a coordinate defines a location of a landmark in the first or second image datasets;
   a registering step for registering with the computer the second image dataset with the first image dataset on the basis of the weight assigned to the each coordinate; and
   a rendering step for rendering a view from the second image dataset based on the registration of the second image dataset with the first image dataset.

2. A registration method as claimed in claim 1 further comprising a coordinate-selecting step for selecting a system of coordinates in the first image dataset.

3. A registration method as claimed in claim 2 wherein the weight-assigning step further comprises assigning a first zero-weight substantially equal to zero to a first coordinate of a certain landmark of the set of landmarks, thereby optimizing a displacement of the certain landmark in the second image dataset relative to the certain landmark in the first image dataset, said displacement being substantially perpendicular to a first coordinate axis of the system of coordinates.

4. A registration method as claimed in claim 3 wherein the weight-assigning step further comprises assigning a second zero-weight substantially equal to zero to a second coordinate of the certain landmark, thereby optimizing the displacement of the certain landmark in the second image dataset relative to the certain landmark in the first image dataset, said displacement being substantially perpendicular to a second coordinate axis of the system of coordinates.

5. A registration method as claimed in claim 4 further comprising an iteration step for rendering a sequence of views from a sequence of image datasets in a cine format where the first image dataset is selected from the sequence of image datasets and the second image dataset is iteratively selected from the sequence of image datasets.

6. A registration method as claimed in claim 1 wherein a rigid transformation is used for registering the second image dataset within the registering step.

7. A registration system for registering a first image dataset from an imaging system with a second image dataset from the imaging system based on a set of landmarks, wherein a landmark is a region of interest in first or second image datasets, said registration system comprising:

a weight-assigning unit for assigning a weight to each coordinate of each landmark from the set of landmarks, wherein a coordinate defines a location of a landmark in the first or second image datasets;

a registering unit for registering the second image dataset with the first image dataset on the basis of the weight assigned to the each coordinate; and a rendering unit for rendering a view from the second image dataset based on the registration of the second image dataset with the first image dataset.

8. An image acquisition system for acquiring an image dataset comprising a registration system as claimed in claim 7.

9. A workstation comprising a registration system as claimed in claim 7.

10. A registration system as claimed in claim 7 further comprising a coordinate-selecting step for selecting a system of coordinates in the first image dataset.

11. A registration system as claimed in claim 10 wherein the weight-assigning unit further assigns a first zero-weight substantially equal to zero to a first coordinate of a certain landmark of the set of landmarks, thereby optimizing a displacement of the certain landmark in the second image dataset relative to the certain landmark in the first image dataset, said displacement being substantially perpendicular to a first coordinate axis of the system of coordinates.

12. A registration system as claimed in claim 11 wherein the weight-assigning unit further assigns a second zero-weight substantially equal to zero to a second coordinate of the certain landmark, thereby optimizing the displacement of the certain landmark in the second image dataset relative to the certain landmark in the first image dataset, said displacement being substantially perpendicular to a second coordinate axis of the system of coordinates.

13. A registration system as claimed in claim 7 wherein a rigid transformation is used for registering the second image dataset within the registering step.

14. A computer program product to be loaded by a computer, comprising instructions for registering a first image dataset from an imaging system with a second image dataset from the imaging system based on a set of landmarks, wherein a landmark is a region of interest in the first or second image datasets, the computer arrangement comprising a processing unit and memory, the computer program product, after being loaded, providing said processing unit with the capability to carry out the following tasks:

assigning with the computer a weight to each coordinate of each landmark from the set of landmarks, wherein a coordinate defines a location of each landmark in first or second image datasets;

registering with the computer the second image dataset with the first image dataset on the basis of the weight assigned to the each coordinate; and rendering a view from the second image dataset based on the registration of the second image dataset with the first image dataset.

15. A computer program product as claimed in claim 14 further comprising an iteration unit for rendering a sequence of views from a sequence of image datasets in a cine format where the first image dataset is selected from the sequence of image datasets and the second image dataset is iteratively selected from the sequence of image datasets.

16. A computer program product as claimed in claim 14 further comprising a coordinate-selecting step for selecting a system of coordinates in the first image dataset.

17. A computer program product as claimed in claim 16 wherein the assigning comprises further assigning a first zero-weight substantially equal to zero to a first coordinate of a certain landmark of the set of landmarks, thereby optimizing a displacement of the certain landmark in the second image dataset relative to the certain landmark in the first image dataset, said displacement being substantially perpendicular to a first coordinate axis of the system of coordinates.

18. A computer program product as claimed in claim 17 wherein the assigning comprises further assigning a second zero-weight substantially equal to zero to a second coordinate of the certain landmark, thereby optimizing the displacement of the certain landmark in the second image dataset relative to the certain landmark in the first image dataset, said displacement being substantially perpendicular to a second coordinate axis of the system of coordinates.

19. A computer program product as claimed in claim 14 wherein a rigid transformation is used for registering the second image dataset within the registering step.

* * * * *